(12) United States Patent
Savastianov et al.

(10) Patent No.: US 8,745,679 B2
(45) Date of Patent: Jun. 3, 2014

(54) METHOD FOR ALLOCATING CHANNEL RESOURCES IN A BROADBAND ACCESS SYSTEM DURING DATA TRANSFER INCLUDING MULTIMEDIA DATA

(75) Inventors: Volodimir Volodimirovich Savastianov, Kiev (UA); Sergiy Mikolayovich Veklenko, Kiev (UA); Petro Volodimirovich Budaev, Kiev (UA); Illia Dmitrovich Semeniuk, Kiev (UA); Yuriy Oleksandrovich Filatov, Kiev (UA); Sergiy Georgiyovich Samillo, Kiev (UA)

(73) Assignee: Tovaristvo Z Ombezhenou Vidpovidalnistu "Inter-Bars 4S", Kiev (UA)

( * ) Notice: Subject to any disclaimer, the term of this patent is extended or adjusted under 35 U.S.C. 154(b) by 0 days.

(21) Appl. No.: 13/991,547
(22) PCT Filed: Sep. 30, 2011
(86) PCT No.: PCT/UA2011/000089
§ 371 (c)(1),
(2), (4) Date: Jun. 4, 2013
(87) PCT Pub. No.: WO2012/082086
PCT Pub. Date: Jun. 21, 2012

(65) Prior Publication Data
US 2013/0276042 A1    Oct. 17, 2013

(30) Foreign Application Priority Data
Dec. 17, 2010  (UA) .................................. 2010015265

(51) Int. Cl.
*H04N 7/173*        (2011.01)
(52) U.S. Cl.
USPC .................................. 725/97; 725/86; 725/95
(58) Field of Classification Search
USPC ........................................................ 725/95, 97
See application file for complete search history.

(56) References Cited

U.S. PATENT DOCUMENTS 7,593,326 B2 *    9/2009    Collet et al. .................. 370/229
7,788,368 B1      8/2010    Scano
(Continued)

FOREIGN PATENT DOCUMENTS

EP        1387583 B1    2/2004

*Primary Examiner* — Robert Hance
(74) *Attorney, Agent, or Firm* — Duane Morris LLP

(57) ABSTRACT

Invention refers to methods of data transfer, in particular—for transferring of multimedia data to user's stations with two-sided mode, for example—when user sends a signal of program (content) choice, and can be used in multiservice networks of digital data transfer, which include voice, video, audio and Internet protocol data (Triple Play services, i.e. High Speed Internet, Broadcast TV, VoIP). Method comprises forming a database of content units to the user or user group, which formed a particular list. On a basis of list make more precise calculation of the required bandwidth in the system by building a queue of orders for the reservation rate for each ordered content unit for each user or user group. Combine the same orders and multicasting of the same custom content units to the user or user group. Carry out the automatic switching user access device (e.g. Set Top Box) on a content channel that has broadcast content unit in accordance with his request. Also carry out the distribution of channel resources through the creation of dynamic content feeds that include content-length T units to be transferred to user groups at certain intervals. Usage of described method for allocating channel resources in a broadband access system during data transfer including multimedia data is notably effective for high-speed broadband wireless access systems, for example—networks like LTE or BARS, etc. with limited resources of data transfer environment, as was described above, and allows to raise optimization of broadband access channel resources, to raise grade of interactivity when providing multiservice data transfer, Triple Play services in particular, especially IPTV services and also essentially reduce expenses for forming of content-unit lists for distribution, as it is done according to analogues (closest prior art) from level of technics.

17 Claims, 8 Drawing Sheets

(56) References Cited

U.S. PATENT DOCUMENTS

Figure 1:
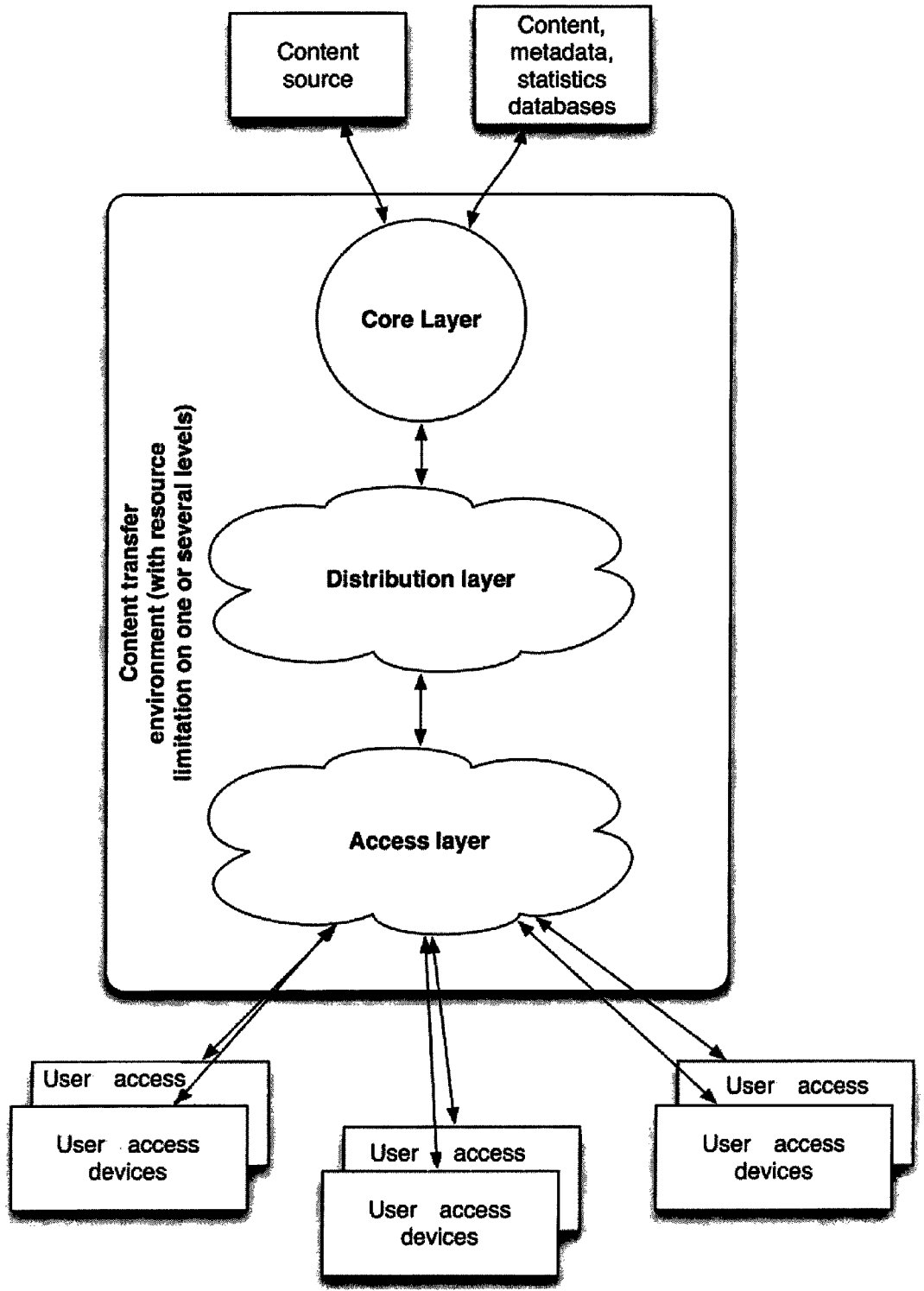

| | | |
|---|---|---|
| 8,392,956 B2 * | 3/2013 | Ramakrishnan ................ 725/97 |
| 2002/0194607 A1 * | 12/2002 | Connelly ........................ 725/87 |
| 2003/0063117 A1 | 4/2003 | Chang |
| 2004/0103120 A1 | 5/2004 | Fickle |
| 2009/0044223 A1 * | 2/2009 | Jiang et al. ...................... 725/40 |
| 2009/0265743 A1 * | 10/2009 | Gao ................................ 725/94 |
| 2010/0058406 A1 * | 3/2010 | Xu et al. ......................... 725/97 |
| 2010/0118754 A1 | 5/2010 | Burton |

\* cited by examiner

METHOD FOR ALLOCATING CHANNEL RESOURCES IN A BROADBAND ACCESS SYSTEM DURING DATA TRANSFER INCLUDING MULTIMEDIA DATA

Invention refers to methods of data transfer, in particular—for transferring of multimedia data to user stations with two-sided mode, for example—when user sends a signal of program (content) choice, and can be used in multiservice networks of digital data transfer, which include voice, video, audio and Internet protocol data.

Multimedia data can be interpreted as a simultaneous use of different forms of presentation and processing of information in a single entity container. For example, text, audio, graphic and video information and also, possibly, a method of interactive interaction with this information, can be contained in one single entity container (http://en.wikipedia.org/wiki/Multimedia).

There are two methods of data transfer, including multimedia data—linear and nonlinear. In case of linear method of data transfer there is no way for user to affect on receipt of this data; user receives them in direct mode. In case of nonlinear method of data transfer user has an ability to interact with multimedia data display tools by means of certain software and/or hardware methods which ensure user participation in selection and multimedia data transfer. This participation in a process of data transfer is also known as "interactivity".

Declarant knows many different methods for allocating channel resources in a broadband access system during data transfer including multimedia data, among which the closest methods by the whole range of dominant features are mentioned below.

There is a known method of video data transfer, containing video services, according to a patent RU 2 384 969, published 20 Mar. 2010 in bulletin No 8, IPC H04N7/16, H04L 12/28. This method allows to implement video data transfer in a broadband access system, transferring of data from user access device to the at least one services server via the data channel of a broadband access system, containing request for receipt of video data, identification of user access device in a broadband access system, video data transferring from the at least one services server to user access device according to the request, received from user access device. Video data transferring from the at least one services server is done via service gateway by means of broadband terminal; its built-in video service component is used as a storage for transferred video data. Video data transferring to user access device according to the request is done from a built-in video service component of a broadband terminal. Video data contain unicast and multicast video services.

Availability of additional built-in video service component in broadband terminal allows to optimize for allocating channel resources in a broadband access system during video data transferring in case of drawbacks in content transfer environment and loss of several unicast or multicast packets, i.e. when operating in emergency situations. This is implemented by means of localizing of packet loss and retransmission of lost packets to user access device in personal unicast mode. This approach gives an opportunity to lower video service demands to frequency band of multicast access system and to lower limitations in frequency band in systems with limited resources of data transfer environment.

However, aforesaid technical result is obtained by presence of additional component, which complicates resources control in a broadband access system. Also, transferring of video data with video service slightly limits application fields of this method. Therewith this method doesn't provide economy and effective for allocating channel resources in normal operation mode of transfer environment en masse, during video data transferring from services server to user access devices wherewith to optimize video streams or content-streams themselves, but not adjusting messages.

There is also a known method intended to execute operations of multimedia data transfer according to a patent RU 2 391 780, published 10 Jun. 2010 in bulletin No 16, IPC H04H 60/91, H04N 7/173. This method allows to implement video data transfer in a broadband access system, transferring from user access device to the at least one services server via the data channel of a broadband access system, containing request for receipt of video data, identification of user access device in a broadband access system, video data transferring from the at least one services server to user access device according to the request, received from user access device. Additionally, recording of multimedia data (content) chosen by user is performed, i.e. data, which is transferred via channel of a broadband access system, and keeping them in database with accordance to user request, sent from user access device, during transferring of this data from services server via channel of a broadband access system to user access device. Recording, suspension and resumption of recording, i.e. operations with data transferred, are performed by means of a controller, which is operated by software from user access device.

In accordance to this method, a lowering of delay period is achieved, which is related to program switching, presence of controller, which is operated by software from user access device. Also this method allows user to switch fast between channels, and special software buffers not only adjacent channels, but also user preferred channels according to viewing statistics. This method allows to perform only independent choice of a certain channel by user and data receiving of this channel, to optimize program reception to user access device from data transfer environment, but doesn't allow to optimize utilization of frequency band of multicast access system en masse. Method allows to perform resource saving only for a certain user access device and this doesn't improve efficiency of for allocating channel resources in a broadband access system with taking into account of preferences of users of data transfer environment, localized on a certain area.

Also system and method for establishing of filtered list of TV-programs based on user profiles by application US 2003/0063117 are known, published 3 Apr. 2003. Method includes broadcast of TV-channel content data to the at least one user access device.

According to application US 2003/0063117, a filtration of channel subset is performed, which are received in broadcast mode. Results are displayed in electronic program guide (EPG) in system, containing the at least one TV set, which displays EPG of several channels, the at least one media hub, connected to TV set, several removable media, which can be connected to media hub for transfer of user profile.

For realization of this method connection or integration of media hub to TV set is performed, additionally hub stores user profiles. Content of EPG and channel list is filtered basing on user profile, stored on removable media. Program choice is based on forming a group preferences, based on analysis of profiles, which are uploaded into media hub, so that they could provide a group interest.

Weakness of mentioned method is that the system performs concordance of group choice based on user profiles, but filtrates only data from EPG and channels from broadcast on local equipment, but in no way is connected to content transfer environment and doesn't perform estimation of its resources. Hereby, invention by application US 2003/

0063117 cannot provide transfer of channels, which are coordinated within a group of users, in the presence of data transfer environment with resource limitations.

There is also a known method of providing access to list of Multiple Triple Play services by application US 2007/0261085, published 8 Nov. 2007. Term "Multiple Triple Play" assumes a list of telematics—information and telecommunication services. According to [Triple Play: Building the converged network for IP, VoIP and IPTV (Telecoms Explained) by Francisco J. Hens and JoséM. Caballero (Jun. 3, 2008) ISBN 978-0-470-75367-5 (PB), C. Siliverstov, Triple Play Services realization in FTTX-based networks, "Communication Reporter", No 4, 2010, http://en.wikipedia.org/wiki/Telecommunication_convergence], users of telematics can be provided with such services—High Speed Internet (HSI), Broadcast TV (BTV), Video on Demand (VoD), near Video on Demand (nVoD, also used as PPV—Pay per Video, imitation of home theater), Voice over IP (VoIP). Especially critical to for allocating channel resources in a broadband access system is BTV or IPTV. According to [http://en.wikipedia.org/wiki/IPTV], IPTV is an interactive TV in data transfer networks with IP protocol. Main advantage of IPTV is interactivity of video services and availability of a wide set of additional services. IP protocol features allow to provide not only video services, but also much wider pack of different services, including interactive and integrated. Hereby, main advantage of IPTV is its interactivity.

According to application US 2007/0261085, in method of providing access to programs from list of Multiple Triple Play services, transferring from user access device to the at least one services server via channel of a broadband access system is performed, containing request for data delivery, including multimedia data, identification of user access device in a broadband access system, transferring from the at least one services server to user access device, including multimedia data according to request, received from user access device, formation of a single data transfer schedule, including multimedia data, for the at least one user access device or the at least one group of user access devices, data transfer through IP-network, including multimedia data for the at least one user access device or the at least one group of user access devices according to schedule. Additionally a list of data is provided to user, including multimedia data, in which user, with the help of a broadband access system terminal, is choosing necessary data from data which is transferring or will be transferred via broadcast (BTV), in certain time intervals. Also an additional data list is formed, including multimedia data, which can be looked through by user in personal mode (VoD/nVoD/PPV), for the at least one user access device or the at least one group of user access devices, and is sent to user and user can perform a request with the help of terminal in order to receive certain data, including multimedia data, combining individual services and beforehand formed schedule into one single schedule.

Weakness of this method is that the system in no way is connected to content transfer environment, does not perform estimation of its resources and cannot provide transfer of channels, which are coordinated by every user, in the presence of data transfer environment with resource limitations. Also system does not coordinate group choice and focuses only on content, which is broadcasted or could be found in base for personal viewing. Schedule of thematic content is also formed on beforehand created PPV or nVoD channels, number of which is not regulated with state and resource limitations of content transfer environment. Additionally, user content choice is made out of preformed by studio list of content-units, but not from free choice of content-units by means of voting among users. Also a mechanism of providing necessary channel bandwidth in situation of parity user choice of several content-units in general and with a glance of resource limitations of content transfer environment is absent.

There is a known method of data transfer in a broadband access system, including multimedia data (application US 201002836, published 21 Oct. 2010). According to this method, data transfer as a flow of content units to user access device is performed, particularly—flow of digital audio data (Internet-radio) by means of broadcast in a broadband access system. Also, a local database with multimedia data, including audio data, containing metadata, is formed. Database with user profile, containing data about user preferences relatively to multimedia data, is formed. According to formed database of user preferences a relevance of next content unit from multimedia data flow is determined. In case of absence of relevance a data transfer of multimedia data from local database, which is relevant to user requests, is performed. And besides, a continuous (seamless) switch of data source is performed by means of connecting to previous content-unit.

Described method allows to reach continuity of multimedia data transfer to user access device in accordance with his preferences. Additionally, this method doesn't allow to take into account preferences of group of users in choice of multimedia data, which is necessary in a broadband access system. Also, this method doesn't allow to take into account state of data transfer environment. Also, a lack of this method is a fixed program of data transfer, i.e. absence of possibility for user or for group of users to choose content-unit when list of data transfer is formed (feedback), which makes impossible to dynamically change of data transfer for inclusion of content-units, available for transferring to user access devices, but which weren't included into list of data transfer during its forming. This leads to impossibility of forming a dynamic multimedia data broadcast and multicast for satisfaction of user preferences according to location of users with taking into account data transfer channel load, especially during implementation of a broadband access system, and, as a result—to absence of providing of data transfer channel resource savings.

Also there is a known method of data transfer in a broadband access system, including multimedia data (application US 20100267331, published 21 Oct. 2010). According to this method, a relevance of multimedia data to user preferences by means of information about multimedia data, which is stored at user access device or remote data bases (libraries, radio translations) is performed, and after that—recommendation to user for connection to multimedia data flow, in particular—Internet radio, which are in accordance to user preferences, is sent.

This method also allows to reach continuity of data transfer to user access device, which correspond to user preferences, without data reception about user preferences from themselves, that simplifies creation of user preferences database, and also takes into consideration preferences of user groups by means of data exchange between remote databases.

The lack of this method, as in a previous method, is an absence of analysis of data transfer environment load and its resource economy, because information about content-units, transferred in a broadband access system and about channel resources is not used. That is why this method doesn't allow to perform calculation of load and release of data transfer environment based on broadcast and multicast transfers, to form list of transfer data in accordance with preferences of user groups, to perform allocating frequency resource at a given time with taking into account of user preferences, grouped by location.

A method was chosen as a prototype, which can be implemented by means of a system of automatic forming a electronic program guide according to a patent EP 1 387 583 B1, published 2 Nov. 2005 in bulletin No 2005/44, IPC H04N 7/173, H04N 5/445. According to this method, like in previous method, a data transfer from user access device to the at least one services server via channel of a broadband access is performed, containing request to receive data, including multimedia data, identification of user access device in a broadband access system, data transfer from the at least one services server to user access device, including multimedia data, in accordance with request, received from user access device, forming a data transfer schedule, including multimedia data, for the at least one user access device, data transfer, including multimedia data, for the at least one user access device according to schedule. Additionally, forming a data transfer schedule, including multimedia data, for the at least one user access device, is performed not only by means of receiving of requests from users and their further processing, but also by means of search of other multimedia data, for example—TV programs, which match with subject area of user request, for their further inclusion into schedule, which is transferred to user. Additionally, a database with information about data type, in particular—multimedia, which prevails in requests of certain user, is formed and used during search.

This optimization during forming a data transfer schedule, including multimedia data, for the at least one user access device, allows to take into account user statistics for time economy of channel search, to create "personal" channel for user, and to perform an inclusion into schedule and transferring to user of any other data, in particular—advertisement, which are characterized by correspondence with information about user preferences, taken from previously formed database.

Weakness of this method is insufficient ability to regulate environment resources of broadcast access system during data transfer in systems, which have physical, resource and other limitations, for example—in high-speed wireless data transfer systems, from services servers (data sources), including multimedia data, to user access device. System does not take into account ability to group users by some criterion and to change data transfer sequence by a group user, including multimedia data, or user choice of some other data, which are different from previously schedule, formed by studio, for multicast or broadcast channels. It is reasonable not only to form database with statistics about user preferences for such systems, but also take into account user localization, which, together with known state of content transfer environment with limited resources, will allow to perform better optimization of schedule with a glance of group preferences from the side of content transfer environment resource economy. Lack of description of user division by data types, which they request and which are transferred at the moment, also is a weakness of this method. Also mentioned method allows to perform so called "seamless" forming a data transfer schedule. This is provided by offer to use only nVoD data transfer for filling of intervals between data transfer, what slightly bounds area of method appliance. Also implementation of such "seamless" forming a data transfer schedule commits intensive user collaboration (reading, clicking and choosing), which lowers attractiveness of usage of this method for user too. Additionally, user content choice is taken out of previously formed list of content-units, made by studio, but not from free choice of content-units by means of voting among users. Also, a mechanism of decision in parity by multiple user choice of several content-units generally, including situations which take into account resource limitations in data transfer environment, is absent.

In the basis of invention a task to increase effectiveness for allocating frequency resource in a broadband access system during data transfer, including multimedia data, especially for a broadband access systems with limited channel data-transfer rate, with simultaneous preservation of user number, who receive these data, and also additional increase of usability and decrease of time consumption to form a data transfer schedule by user, i.e.—increase of "interactive" part of multimedia data transfer, is set.

Defined task is solved by method for allocating channel resources in a broadband access system during data transfer, including multimedia data, which includes data transfer from the at least one user access device to the a broadband access network kernel through a broadband access channel, containing data comprising request for content data, including multimedia data. User access device in a broadband access system is identified by means of access level of a broadband access system. Content data, including multimedia data, from the network kernel of a broadband access system to the at least one user access device, is transmitted according to request, received from user access device. Schedule of data transfer with content, including multimedia content, is formed for the at least one user access device or for the at least one group of user access devices. Content data, including multimedia data, is transferred by unicast, multicast or broadcast for the at least one user access device or for the at least one group of user access devices according to schedule.

According to invention, base of permanent content-channel transfers is formed, containing fixed frequency characteristics and/or signal modulation mode in channel of a broadband access system for transfering of permanent content-channels multimedia data and/or permanent content-channels identifiers, list of content-units of current dynamic content-channels, content-units metadata and current dynamic content-channels identifiers. Also a base of VoD and/or nVoD (PPV) multimedia data is created, which can also contain content-units of permanent or current content-channels. Multimedia database of VoD and/or nVoD services can be joined with base of permanent content-channel transfering and base of current dynamic content-channel transferring. Forming a multimedia data channel is also performed, containing content-units of advertising and/or information content. A data packet is sent to the at least one user access device, containing content-units of permanent content-channels, current dynamic content-channels, content-units metadata, and/or VoD, and/or nVoD services data, and/or multimedia channel data. To user access device data is sent, containing request for choosing of a content-unit from a permanent content-channel or dynamic content-channel or VoD and/or nVoD services data in time interval T. Data forming and transferring are performed from the at least one user access device to network core of a broadband access system concerning user choice of the at least one content-unit of current dynamic content-channel or content-unit of permanent content-channel or VoD and/or nVoD services or any other multimedia service. Database is formed on network core services server, containing data about each identified user or about each group of identified users, containing data about user choice of content-channels content-units or VoD/nVoD services. Number of users with identical choice of content-unit in time interval T based on formed database statistic is determined, and relying on that statistics existing groups of users are regrouped or new groups created. The at least one boundary value of users number with identical choice of content-unit is set. Data transfer schedule with content-units of current dynamic content-channel and/or content-units of permanent content-channel and/or VoD and/or nVoD services is formed accordingly to data, which is received from the at least one user access device, for the at least one user access device or the at least one group of user access devices. Quantity of data packet transferring of multicast and/or broadcast in downstream channel of a broadband access system for content-unit is increased, which was chosen by a number of users, greater then boundary value, and/or for multimedia data during time interval $t_1<T<t_2$, where $t_1$—beginning of content-unit transferring, which was chosen by a number of users, greater then boundary value and $t_2$—ending of content-unit transferring, which was chosen by a number of users, greater then boundary value, accordingly to schedule. Then the quantity of data packet transferring of multicast and/or broadcast in downstream channel of a broadband access system in time $t_k>t_2$ for content-unit is decreased, which was chosen by a number of users, greater then boundary value. Data block forming and transferring to the at least one user access device is performed, containing data with information message for users about access time $t_3$ to content-unit, which was chosen by a number of users, smaller then boundary value, or information message about ability to download in time $t_4>t_3$ content-unit, which was chosen by a number of users, smaller than boundary value, through VoD and/or nVoD services. Content-units of permanent content-channel are transferred accordingly to current data transfer of permanent content-channel to the user access device or content-unit of permanent content-channel, which is alike by meaning or any other features or metadata with content-unit, which was translated during time T, or content-unit of permanent content-channel, which was chosen by most users accordingly to statistics database to the at least one user access device, which did not send data about user choice of content-unit accordingly to request. Data forming and sending is performed, containing contextual advertising or reference information, to user access device from group of identified users, formed accordingly to statistics database. Message forming and sending to user access device about switching to another current dynamic content-channel or to download and playback previously formed data by means of VoD and/or nVoD to identified user access device on each group of identified users, formed accordingly to statistics database, is performed. Database forming on services server in network core is performed, containing data on each of identified users or on each group of identified users, formed according to criteria: data about request or choice of content-units or content-channels or VoD and/or nVoD services, or data with review about content-unit or content-channel or VoD and/or nVoD services, or data about quantity and time of switching between content-channels or VoD and/or nVoD services, or multimedia channel data sent through unicast system or multicast system.

The whole set of essential differences mentioned above leads to economy of a broadband access channel resource in dependence on type of data with content-units and during processing of request statistics for receiving of content-units, which arrive from user access devices and/or user groups.

Both forming a data transfer schedule with use of search inquiries from user access device and execution of content-unit search by defined similarity criteria, allow to save content transfer environment resource by connecting of user access device to viewing of content-unit, whose content-channel data is transferring. Preliminary data sending with information about possibility to connect to the content-channel with content-unit, which qualify user request, to user access device, is possible. In this case an estimation of content transfer environment resource for data receiving about time, which is necessary for data receiving, containing necessary content-unit and form transfer sequence to the at least one user access device per day or several days, is performed. In this case there is a possibility to group several user access devices into groups by certain attributes, for example—in dependence from requested content-unit types. Also, after forming a transfer sequence, there is a possibility to perform more specific calculation of necessary a broadband access channel resources for performing data transfer for growth of savings on:

forming a data transfer sequence for bandwidth reservation for each content-unit according to request from each user access device or each group of user access devices;
  simultaneous data transfer for user access devices, which sent requests to receive identical or similar content-units;
  switching of user access device to receiving of data with content-channel, which correspond to request from user access device and are transferred in data transfer environment.

Also, attributes, stated above, allow to form certain dynamic content-channel, which will be sent to a group of users, which was chosen by a certain attribute, for example—users of a certain social network or rural dwellers, visitors of a certain facility, etc. Hereby, this channel will contain content-units, which comply with requests of user group or similar by content or other features or metadata and time of their transmission is coordinated according to user requests. Also, in contrast to the analogues which were listed in section "Technology level", forming a such channel can be performed not only beforehand, but during the data transfer and forming a data with content-units can be performed both with user participation by means of sending requests and receiving replies with his choice, and in background—without user participation.

Reasonability of bringing into service of such dynamic channels, which will contain data according to user requests, grouped by some attribute, in networks with limited data transfer channel resources, is dictated by growth and development trends of video data amount, personal video content-units, Web-TV, interactive and/or personal advertisement (source: Cisco VNI projection) and interactive content-units (Apple Event presentation, January 2010) with simultaneous growth and popularization of social and group services. Experience of usage data transfer for target groups acquired a good reputation in video data transfer in such services, as Apple Event Live, Cisco WeBex seminars, video grouping on YouTube. Similar results are confirmed by user viewing statistics of TV content-units (trade report "TV in Russia 2010", Federal Agency of Press and Mass Media, May 2010), additionally, user groups can be segmented.

As an example of application of allocating channel resource method in a broadband access system could be used a building of data transfer network with LTE technology (full name—3GPP Long Term Evolution), technology of mobile data transfer or WiMAX (Worldwide Interoperability for Microwave Access), telecommunication technology, designed for providing of universal wireless communication on wide ranges for wide range of devices (from workstations and laptops to mobile phones) or BARS network (Ukrainian patent UANo 226552), which were created with radio relay lines, point-to-point or point-to-multipoint links or any other technologies of wired and wireless data transfer, where a lack of frequency resource of a broadband access channel is present in case of simultaneous transfer of content-units. Implementation of such content-channels as a method of channel resource saving can create a natural conversion from the model of continuously transferred content-channels to the model of absolutely personified content-channels.

In LTE example it is obvious that in radio frequency channel, which consists of several subchannels with total bandwidth up to 300 Mbps in downstream (DL channel, Download channel) will be available three data groups: multicast data transfer of permanent content-channels (1/N of broadband channel capacity), multicast data transfer of current dynamic content-channels (1/M of broadband channel capacity) and multimedia data transfer of VoD/nVoD services and any other data, which are transferred to user access device (1/K of broadband channel capacity), which altogether create total bandwidth—nominal carrier capacity of transmission band (K+M+N=1) in data transfer environment. Data transfer of permanent and current dynamic content-channels in separate system channels is also possible, which were created by DVB-H transport (Digital Video Broadcasting—Handheld), etc. and data transfer technology of digital video signal to mobile and fixed user access devices. Together all content-channels of content-unit transfers and other data in terms of user access device, form a united environment of content-units transfer in a broadband access system.

LTE building scheme, described above, works in BARS system too or in any other similar system. With the use of additional capacities, for example—existing DVB-H or DVB-T networks, there is a possibility to share their resources.

There is a possibility to build a similar scheme of data transfer in radio relay line.

Usage of mentioned above three types of content allows to bring in additional parameters in QoS model (Quality of Service model). This term in data transfer field is used to call a probability of compliance of a broadband access system (data transfer environment) to the specified data transfer regulations. Introduction of additional parameters allows a more flexible control of broadband access system resources in dependence from various conditions, which affect the data transfer channel. In particular, weather changes lead to bandwidth reduction. That is why operator, who builds a broadband access system and uses described method of channel resource saving, can allocate resources for three data types beforehand. During bandwidth reduction, data transfer with permanent content-channels will remain untouched, data transfer of dynamic content-channels and transfer of any other data will be reduced. Since number of dynamic content-channels can be regulated according to offered method at every moment of time, there is a possibility for a flexible limitation by means new dynamic content-channels at the moment of bandwidth reduction and by this—perform a broadband access system channel saving.

Additionally formed list of content-units, which fill the content-channel, can represent additional information, including data from other users about content-units by means of extraction of metadata and sending from according content-channel databases to user access devices.

For example, this information can be "quantity" of content-unit subscribers, i.e. quantity of requests, which were sent from user access devices or customer rating for content-unit or any other data.

Hereby, declared method allows to save broadband access channel resources simultaneously with multicast or broadcast data transfer, which are necessary to predetermined or overwhelming majority of users according to their request in definite time term with guaranteeing of other users access to the necessary data in a comfort way.

Also declared method allows to raise usability of content-unit list, i.e. decrease time consumption for forming this list and increase user reception usability of content-units.

Additional data for transfer through a broadband access system can include data from IP-packets and/or voice signal and/or video signal and/or multimedia channel data.

Hereby, transfer of data, which include Triple Play services, i.e. High Speed Internet, Broadcast TV, VoIP, is reached.

In addition, growth of frequency range width of downstream channel of a broadband access system for content-unit, which was chosen by a number of users, bigger then boundary value, and/or for multimedia data, during time interval, can be performed.

Also reduction of frequency range width of downstream channel of a broadband access system for content-unit, which was chosen by a number of users, bigger then boundary value, and/or for multimedia data, during time interval $t_2$, can be performed.

Thereby, a flexible regulation of channel resources in dependence from its load in a certain time interval is achieved.

In addition, during forming a data, that contain schedule of dynamic content-channel content-units, permanent content-channels, VoD and/or nVoD services, audio, video data fragments can be added.

Thereby, information data for improvement of user work with list of content-channels and for possibility to get advertising and/or information content, is additionally sent.

In addition, user access to database, containing data about each identified user or each group of identified users, can be performed.

Thereby, users are additionally informed about ratings of separate content-units or content-channels, thus allows to decrease time of user work with list of content-channels.

In addition, data block transfer between user access device and network core services server by means two-sided communication between base station and user station of a broadband access system, can be performed.

Thereby, creation of conventional access system to data through a broadband access wireless system, which can provide transferring of digital services and multimedia content-units to user access devices, is performed.

In addition, a division of each data block into N-parts in converter of base station direct channel can be performed.

Also, an encoding of each N-part of data block by means of an encoder of base station into the transport code can be performed.

Also, a conversion of each encoded N-part of data block in an N-modulator of direct channel of base station into a signal can be performed.

Also, a transfer of signal to the receiver of user station by means of the base station antenna can be performed.

Also, a signal demodulation of by means of N-demodulators of user station can be performed.

Also, a combining of N-parts of demodulated signal into the data block by means of the user station converter can be performed.

Also, a creation of a database, containing data about user choice, on each sector of base station antenna, can be performed.

Also, a conversion of each encoded N-part of data block into a signal by means of the an N-modulator of direct channel of base station, which is located separately from the a corresponding N-transmitter of base station, can be performed.

Such division of data block into parts and guaranteeing of their reception and transferring between user station and base station of a broadband access wireless system allows to scale a broadband access system flexibly and to optimize a broadband access system channel capacity depending on data type, i.e. data for unicast, multicast and broadcast.

Also, a data block transferring between user access device and network core services server by means two-way connection between base station and user station in a wireless broadband access system with usage of duplex channel with time division or duplex channel with frequency division, can be performed.

Thereby, this method allows to organize data transfer from base station to user stations without its encapsulation into transport DVB flow, due to that downstream speed of a separately taken pipe can reach big values (dozens and, maybe, hundreds of Mbps).

Also, a data block transfer between user access device and network core services server by means two-way connection between base station and user station in a wireless broadband access system with usage of the asymmetrical channel, can be performed.

Thereby, a broadband access channel speed is increased by means of division of input and output data relatively to user access device based on statistics concerning data flow ratio from/to user and data transfer environment state.

In order to explain object of the invention, hereinbelow is an example of an execution of specific method for allocating channel resources in a broadband access system during data transfer including multimedia data. Example is illustrated with following schemes:

FIG. 1—general scheme of content transfer environment building.

Figure 2:
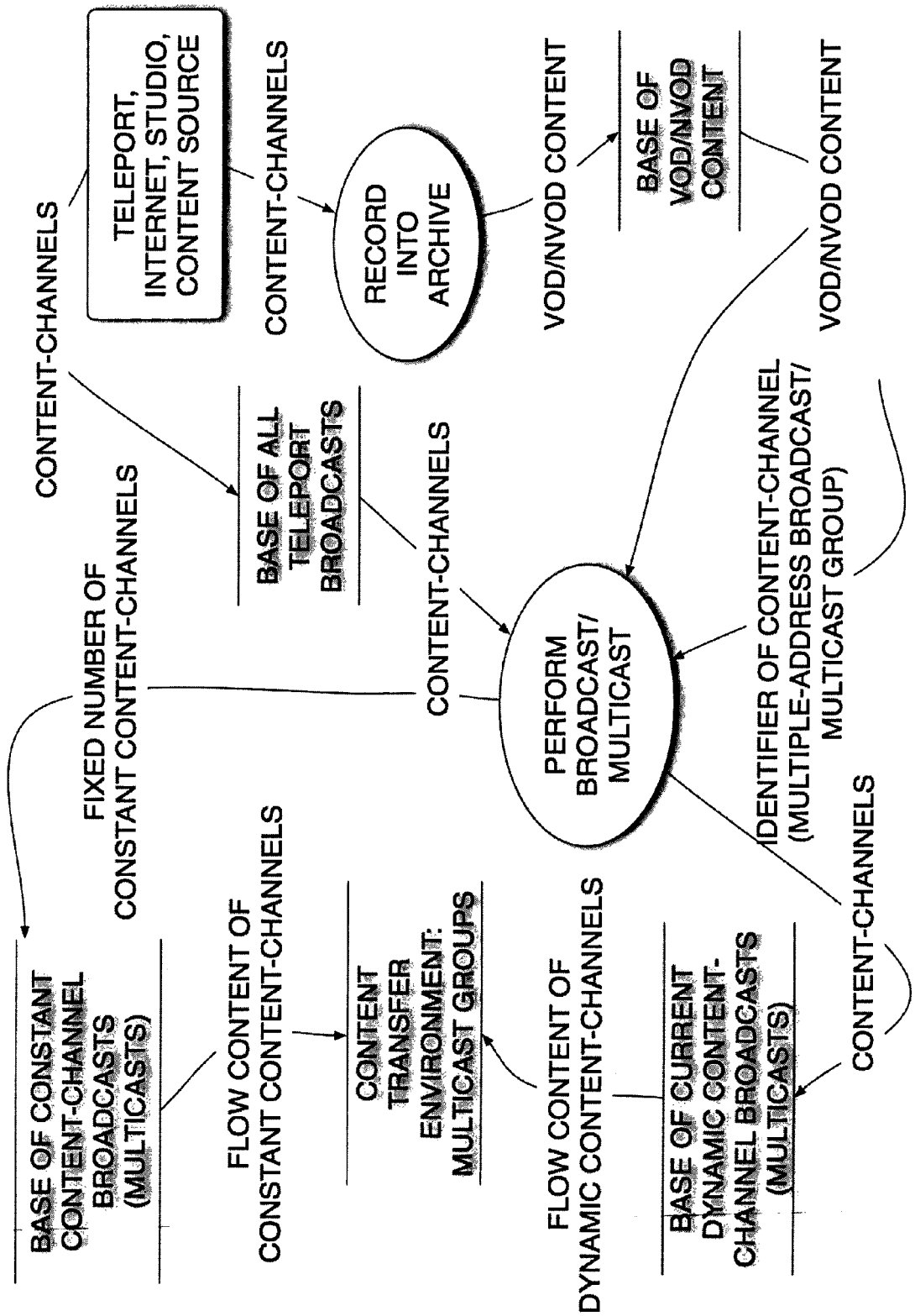

FIG. 2—scheme of data reception, processing and further distribution before inputting into content transfer environment.

Figure 3:
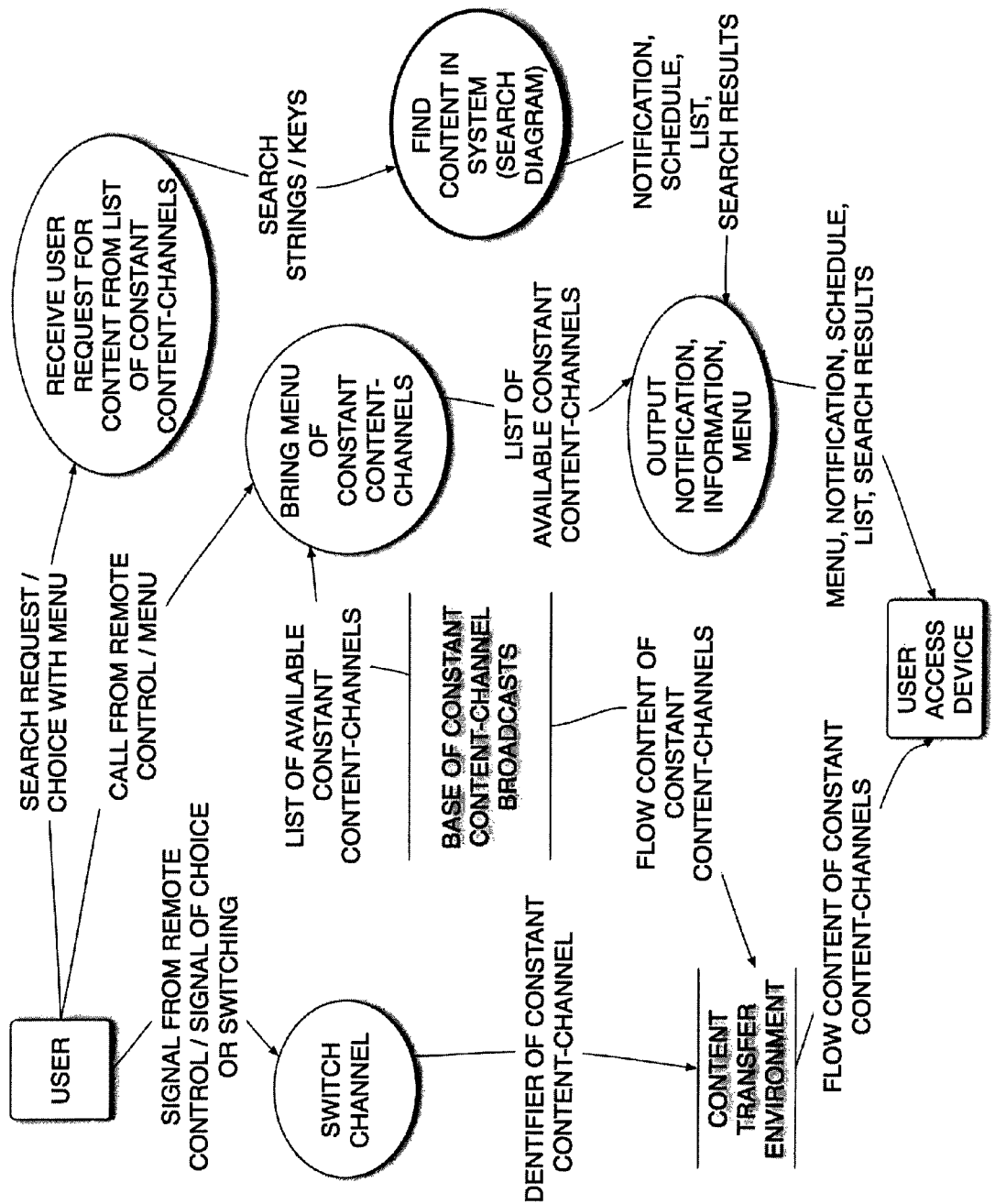

FIG. 3—scheme of data transfer of permanent content-channels

Figure 4:
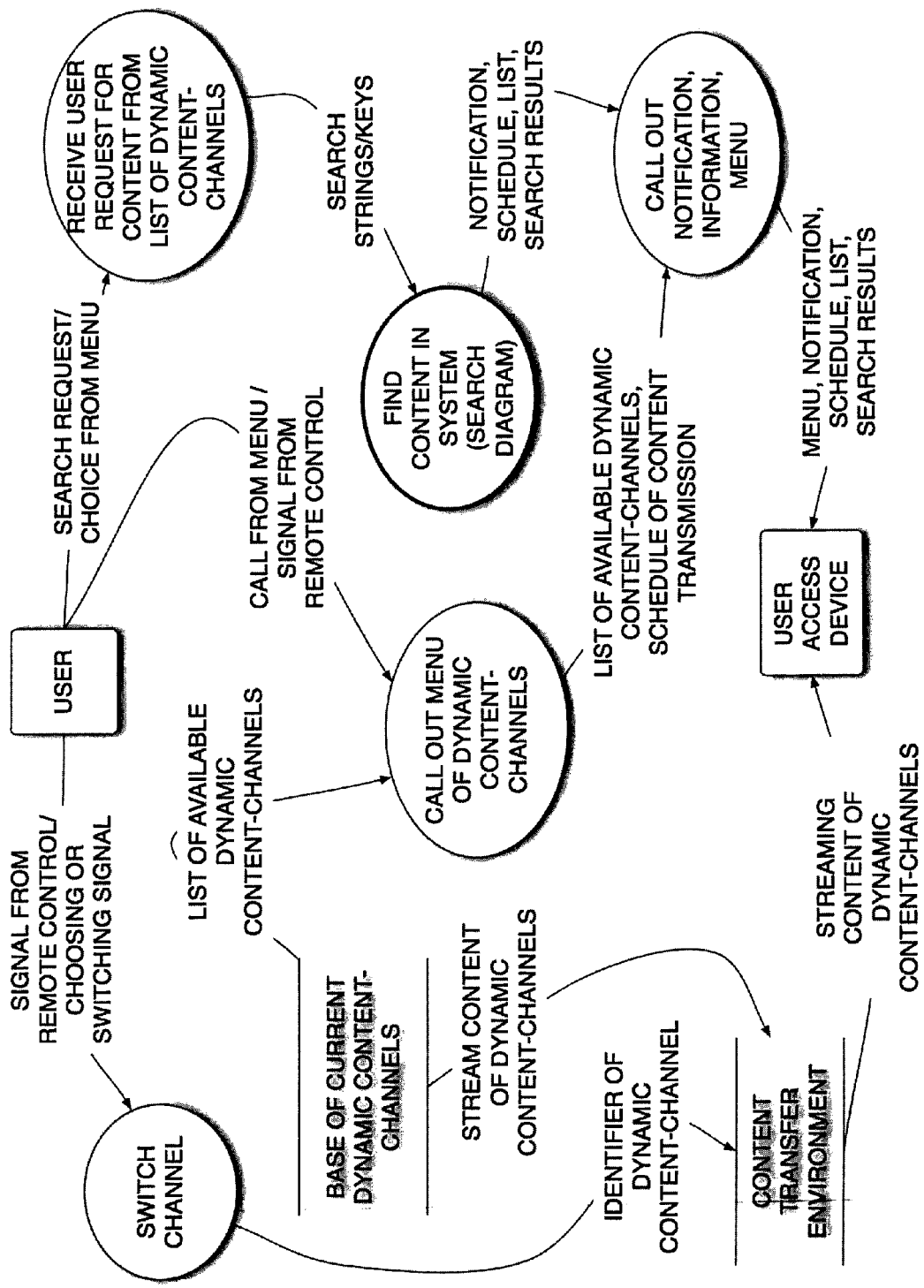

FIG. 4—scheme of data transfer of current dynamic content-channels

Figure 5:
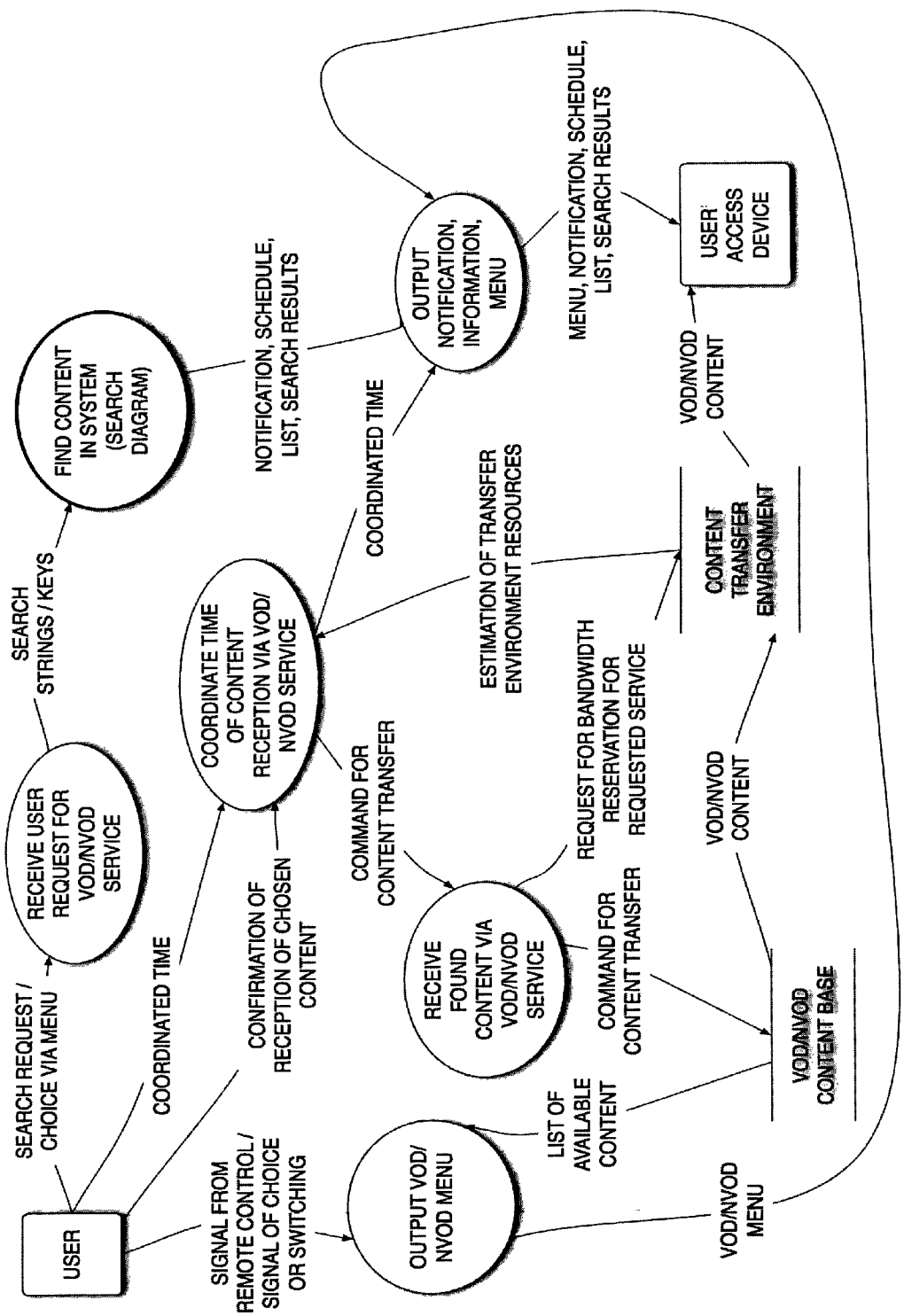
Figure 6:
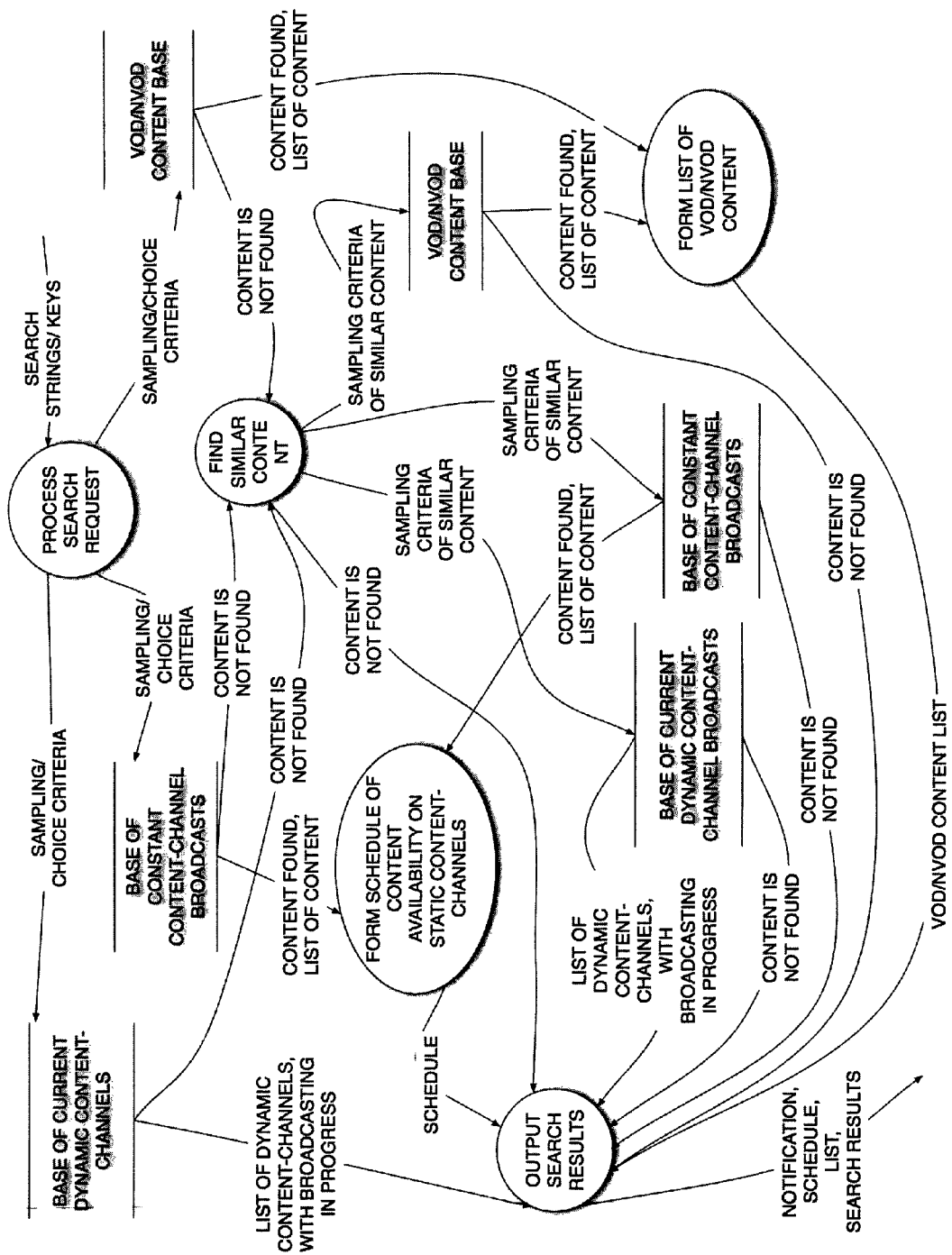
Figure 7:
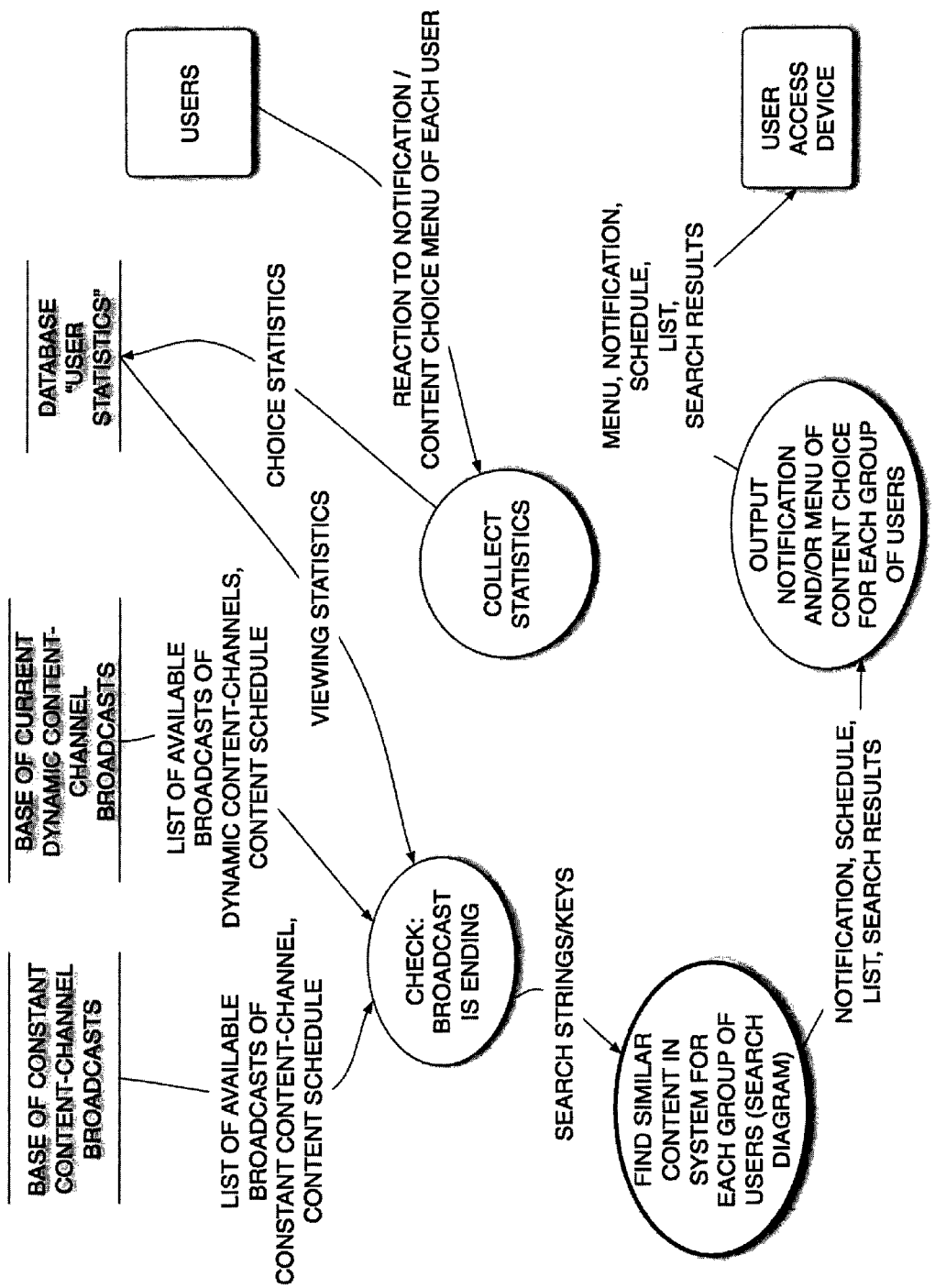
Figure 8:
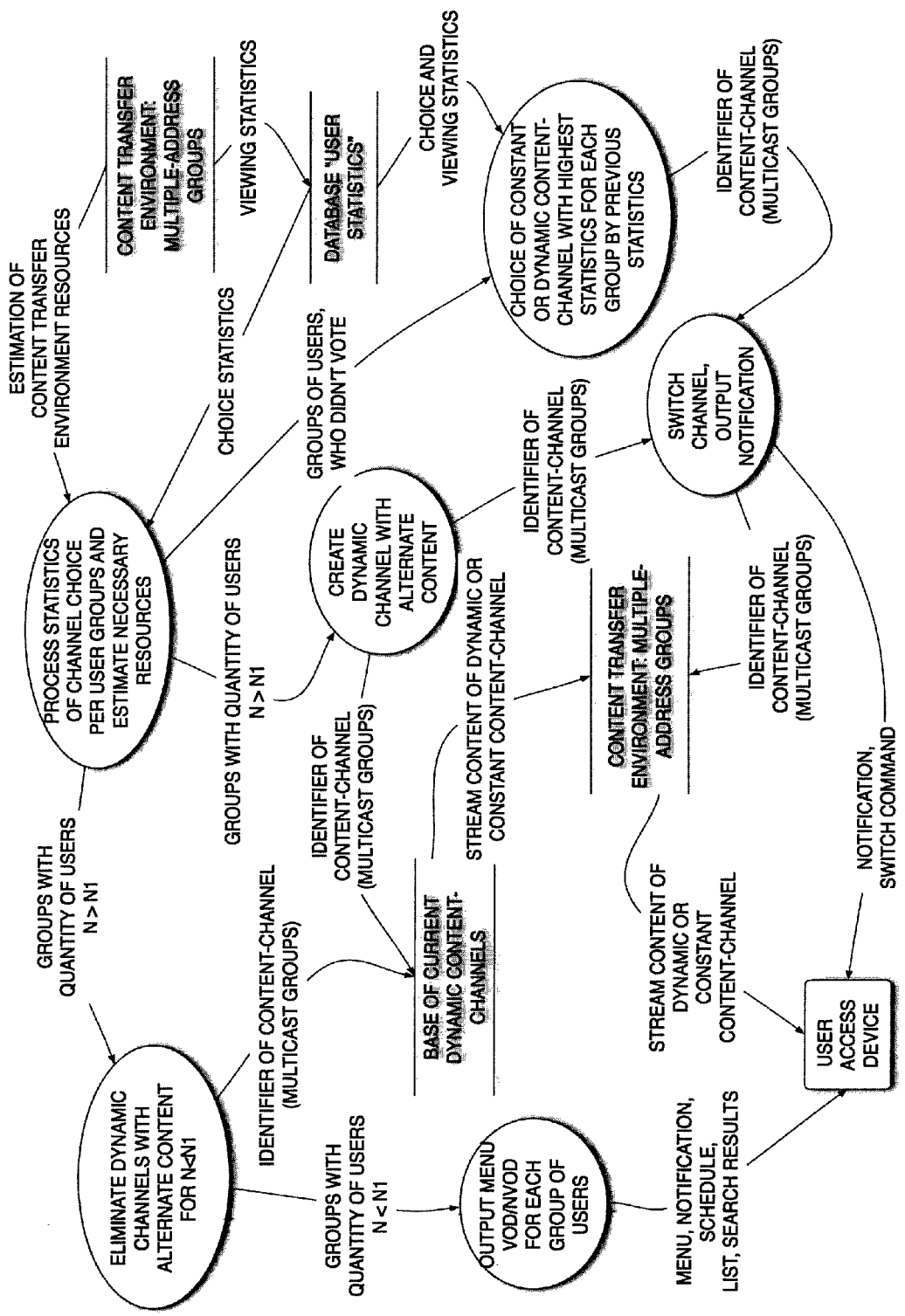

FIG. 5—scheme of request sending and data reception according to VoD and/or nVoD services FIG. 6—scheme of content-unit search according to user request FIG. 7—scheme of schedule forming a dynamic content-channel FIG. 8—scheme of forming and transfer a dynamic content-channel data Figures, that describe invention and given example of execution of specific method for allocating channel resources in a broadband access system during data transfer including multimedia data, in any way does not limit amount of claims, given in Claim, but only describe object of invention.

Data transfer environment, which is a part of data transfer system, consists of three levels: network core, distribution level and access level (FIG. 1). Data transfer environment usually means a system of bands, frequencies, data channels, equipment, which forms a united data transfer environment between network servers, user access devices, communication centers, etc.

Network core can be connected to the at least one source of content-units, which can be represented by TV studio, Internet, etc., and can be connected with databases, containing content-units, metadata or statistics. Metadata is an information, which describes content-units. For example—packets with EPG data (Electronic Program Guide), i.e. TV Guide service—interactive service in content-channel transfer environment, which is implemented through a broadband access system, additionally during content-channel transfer by means of MPEG-streams (MPEG, group for digital audio and video standard production, MPEG-stream contains MPEG video data and MPEG audio data). Program table (MPEG-stream) can also be used as an example. External sources of metadata can be used as a source of metadata, which describe content-units, for example, in XML-TV model (XML file format, used for description of TV program in IPTV) or WEB-TV (software for transferring TV content-channels) and also content-units, which were created by users, video-conferences, video calls, etc. and their statistics.

Environment access level is also combined with user access devices.

Usually, source of content-units transmits either data with content-channels, which are real-time services, or data flows by request from user access device. Data with content-channels can be, for example, separate TV shows, radio shows, movies, etc. Data with content-units can be uploaded into VoD and/or nVoD services multimedia database or broadcasted.

Thereby, each content-channel is identified by its identifier. Content-channel identifiers are data, which is intended to mark each content-channel or its smallest components, including transport components, which then are used in data transfer with content-channels control. PID, IP, identifier of multicast group, MPLS-label are examples of identifiers.

For some broadband access systems limitations in quantity of content-channel data, which can be transferred simultaneously through a broadband access channel, are known beforehand. That is why, usually, data with certain amount of content-channels is transferred in content transfer environment permanently, and data with other part of content-channels is transferred accordingly to requests, which are received from user access devices. This scheme of content-channel data transfer accords with broadcast policy in broadcast TV networks as of today. According to this policy, part of data, containing TV channels, for example—national in Ukraine or federal in Russia, will be transferred permanently, i.e. system resources are allocated for transferring, identifiers or frequency parameters and signal modulation mode in a broadband access channel for transferring of permanent content-channel multimedia data, are set. Other data, containing content-channels, will be sent to user in case of receiving request for receipt from user access device.

According to invention, content-channels, which are transferred to user access device permanently, are called permanent content-channels and other accessible channels are called dynamic content-channels.

Metadata, description, identifiers of suitable content-channels are recorded in permanent content-channel broadcast base and in dynamic content-channel broadcast base. Permanent content-channel broadcast base and in dynamic content-channel broadcast base purport database, which stores data about content-units of an content-channel, which is translated, its description, identifiers of content-channels. Also every database is connected with data storage, for example—servers, by means of which some "buffers" for content-unit recording and transferring them to user access devices with estimated time shift, in example—another time zone, are created.

Therewith information about identifiers of dynamic channels, which are transferred through content transfer environment at the moment by user request, is recorded into current dynamic content-channel base.

Control of data transfer with content-channels is performed by assignment identifiers to content-channels for content-unit delivery to user access devices.

Reception, processing and further data allocation before inputting into content transfer environment (usually, this functions are carried out by main station, or Head-end, http://en.wikipedia.org/wiki/Head_end) is performed in the following way.

According to FIG. 2, data transfer with content-channels from teleport or source of content-units to broadcast base of all teleport channels and to VoD and/or nVoD content base is performed for recording of content-units. Typical teleport is a system of satellite tools (commonly, used for simultaneous work with several satellite retransmitters), tools for communication with ground networks of general usage and supply systems (uninterruptible power supply, safety system, etc.), source—http://www.connect.ru/article.asp?id=7954.

Simultaneous data transfer with fixed number of constant content-channels to broadcast database and data transfer with other content-channels, which are broadcasted at the moment according to requests, which were received from user access device, including VoD and/or nVoD services, to current dynamic content-channel base, are performed. As a result, data-flow of constant content-channels and data-flow of dynamic content-channels are sent from an databases through content transfer environment to groups of user access devices.

According to FIG. 3 and FIG. 4, data transfer of constant content-channels and current dynamic content-channels in compliance with requests from user access devices is done in the following way.

Users receive data with content-channels to their terminals (computer, STB (set-top-box), player, TV, smartphone, etc.) and view it by means of, for example, some controlling interface. One of the alternatives of viewing content-channel is choosing of content-channel via switching, by its number or choosing from a list of content-channels, similarly to watching of usual TV channels. User can recall information search menu with a list of programs, with indication of genres or any other additional information concerning content-channel or content-units for user navigation improvement. Also, user can input his own search strings through control interface of terminal for further search of most suitable content-units, which are sent through content-channels at the moment. After sending a command of choice or switching from control board of terminal, order of content-channel for reception from content transfer environment is performed.

There could be a situation when user is unsatisfied with content-units, which are transferred through constant and current dynamic content-channels or wants to receive content-units, including exclusive content-units, from multimedia data by means of VoD and/or nVoD services (FIG. 5).

In this case, search in VoD and/or nVoD content database is performed and, if user is satisfied with search results, they are displayed on user access device screen. Search results can contain additional metadata, such as rating, newness, duration of content-unit transmission, etc., which improve user choice.

In case, if, according to search results, same or similar content-units are translated at the moment of search implementation in data transfer environment, a message with request to connect for viewing of indicated and already transferred content-units is sent to user access device. This allows to perform saving of content transfer environment resource in case if it has no matter for user when to view content-units. Therewith probability of user connection to viewing of content-unit with high rating is high, if user is unsatisfied with content-channels he is watching now.

VoD and/or nVoD services data transfer is performed immediately after user confirmation of reception of chosen content-units (VoD) or after time of content-units reception approval (nVoD) by means of service menu. For this content transfer environment estimation is performed and message about time, necessary for VoD or nVoD data transfer, is sent.

Therewith different schemes for content-unit transfer of VoD or nVoD services are possible, for example—by means of forming a content-unit list, which correspond with user request, per day or per week and time approval of content-units transfer. In this case, after receiving of indicated content-unit lists from several user access devices, correction of resource estimation in a broadband access system is performed, what results in rising of content transfer environment resource savings.

According to FIG. 6, during search of content-units correspondingly to user request in a broadband access system, when data with search strings from user access device is received, they are processed, sorting criteria are formed and search in static content-channel database, current dynamic content-channel database (at the time of search performance) and VoD or nVoD content database is performed. Search results are displayed at the screen of user access device. If user is satisfied with search results, phase of search beginning is called. If user is not satisfied with search results, new search criteria of similar content-units are formed. Similarity criteria are formed by means of user himself or on the basis of statistics, taken from network core services server or taken from external source, for example, with metadata. In similar way Apple Genius System works, which is a part of iTunes®/iOS software from Apple. According to newly formed criteria, a new selection from static content-channel broadcast database, current dynamic content-channel database and VoD or nVoD content database is performed. According to FIG. 7, FIG. 8, process of content-channel data transfer schedule forming, forming and transferring of this data is performed in the following way.

Dynamic content-channels are content-units with duration T, where T—time interval, which are received by groups of user access devices in a specific time interval. Quantity and order of data transfer by means of dynamic content-channels are formed accordingly to content transfer environment resources and to requests, which were received from user access devices. Indicated dynamic content-channels can be formed out of content-units, which are sent from static content-channel database, current dynamic content-channel database (at the time of search performance) and VoD or nVoD content database.

Group of user access devices can be formed on any grounds, for example—participants of same social network, fellow citizens, coworkers, schoolmates, etc.

An example of process of dynamic content-channel creation is following. Data with content-unit list from static content-channel database, current dynamic content-channel database (at the time of search performance) and VoD or nVoD content database and data with request for choice of content-unit of constant content-channel or dynamic content-channel or VoD and/or nVoD service data in time interval T are sent to user access devices.

At the data reception, containing request for choice of content-unit of constant content-channel or dynamic content-channel or VoD and/or nVoD service data in time interval T, forming and transferring from the at least one user access device to a broadband access network core are performed.

Also a database forming is performed, for example—on network core services server or on interim device, containing data about each identified user or about each group of identified users, data about user choice of content-channel content-units and VoD and/or nVoD services, mainly, for estimating a number of users with same content-unit choice in time interval T based on formed database.

Also, the at least one boundary value $N_1$ for user number with same content-unit choice is set.

For example, at the end of transmission of some content-unit of constant or current dynamic content channel users receive massage from choice menu, by means of which it is allowed to choose viewing of other content-unit in the following time interval. Choice menu can contain several items concerning different time intervals. Users can choose proposed menu items or abstain from choice, in this case no signal will be sent from user access device.

Therewith in case of constant content-channel content-unit transmission user can accept or decline with further broadcast according to preselected data transfer schedule or choose another content-unit from list of content-channels, for example—TV-broadcast.

Data transfer schedule with content-units of current dynamic content-channel and/or content-units of constant content-channel and/or VoD and/or nVoD services according to data, received from the at least one user access device, for the at least one user access device or the at least one group of user/users terminal, is formed.

Then analysis of user choice results is performed, choice rate $N_{(i)}$ (where i—user grouping parameter) is calculated, for example—number of users, who chose same content-unit. Rate $N_{(i)}$ is compared to fixed boundary value $N_1$ for each i-group. In case of $N_{(i)} > N_1$ and in the presence of available resources for each content-unit identifier is reserved, for which $N_{(i)} > N_1$, and transmission of these content-units from current dynamic content-channels base is performed. Also quantity of multicast and/or broadcast data packets can be increased. Also quantity of multicast and/or broadcast with content-unit, which was chosen by a number of users $N_{(i)}$, bigger than boundary value $N_1$, during time interval $t_1 < T < t_2$, where $t_1$—beginning of content-unit transmission, which was chosen by a number of users, bigger than boundary value, and $t_2$—completion of content-unit transmission, which was chosen by a number of users, bigger than boundary value, according to schedule, in a downstream broadband access channel, can be increased.

Increase or decrease of frequency bandwidth of a broadband access downstream channel for content-unit, which was chosen by a number of users, bigger than boundary value, and/or for multimedia data, during time interval T, can be performed for optimization of a broadband access channel resource in case of usage of declared method in high-speed broadband wireless access system. In this case saving of downstream and upstream channel resource occurs. Downstream system channel is used for data transfer from base station (BS) to user station (US, CPE) according to multiple-address broadcast scheme. Therewith antenna, which allows transferring data to several US simultaneously, is used. In the opposite direction US uses upstream channel to BS, that is used to transferring data packets, including data packets with users' requests.

Thereby, for increase of width (band) and/or quantity of broadband access channels of such system, availability of free frequency channel among antenna sectors is checked and one more frequency channel, in case, if a free channel and free or reserve transmitter are found, is used.

Also, considering that in line with modifications of claimed method, data block division in downstream and upstream channels between BS and US into N-blocks, is performed, for example—by means of guaranteeing of reserve quantity of demodulators, i.e. which are not used at the certain moment, usage of additional frequency channel of a certain sector in case of increase of data packets, which have to be transferred between BS and US, is provided.

After the end of content-unit transmission, during which a survey took place, data of content-channel, which was chosen by users, is sent to groups of user access devices, i.e. "background" (unnoticeable for user) switching of content-channel, in response to the user request, is performed.

At the same time for groups of users, for whom $N_{(i)} < N_1$, data, containing menu with offer to receive content-unit via VoD and/or nVoD services at time $t_3$ or information about possibility to receive content-unit via VoD and/or nVoD services at a later time $t_4$, is sent.

In case, if there is no request/no reaction from user access device after time $t_2$ data transfer of the same constant content-channel or similar by certain attributes constant content-channel or content-channel data, which was chosen by a majority of users at the present moment and for which increase of data packet transfer quantity of multicast and/or broadcast in a downstream broadband access channel might have been performed, would be performed to the user access device.

After completion of regrouping of user access devices for transferring of data with content-channels or VoD and/or nVoD services, decrease of data packet transfer quantity of multicast and/or broadcast in a downstream broadband access channel at time $t_k$, later than completion time of previous content-unit transfer $t_2$, is performed. Thereby, a broadband access system channel resource is released by means of stopping of most dynamic channel transmission, identifier of this dynamic channel is labeled as free and is sent back to the current dynamic content-channel base.

Also a database on network core services server, containing data about each identified user or each group of identified users, can be formed. Forming criteria can be:

data about request or choice of content-units or content-channels or VoD and/or nVoD services;

data with review about content-unit or content-channel or VoD and/or nVoD service;

data about quantity and time of switching between content-channels or VoD and/or nVoD services;

multimedia channel data, which was sent via unicast or multicast.

During transfer of data with content-channels or VoD and/or nVoD services data, multimedia channel data transfer can be performed. This data can contain additional information or contextual advertisement to the user access device from a group of identified users, formed in accordance with statistics database. Thereby, transmissions and content of this data have nature, which is intended for a certain user or a group of users, in accordance with information from statistics database.

Usage of described method for allocating channel resources in a broadband access system during data transfer including multimedia data is notably effective for high-speed broadband wireless access systems, for example—networks like LTE or BARS, etc. with limited resources of data transfer environment, as was described above, and allows to raise optimization of broadband access channel resources, to raise grade of interactivity when providing multiservice data transfer, Triple Play services in particular, especially IPTV services and also essentially simplify and reduce expenses for forming a content-unit lists for distribution in comparison, as it is done according to analogues (closest prior art) from level of technics.

The invention claimed is:

1. A method for allocating channel resources in a broadband access system during data transfer, including multimedia data, which includes (a) transferring, from at least one user access device to a network kernel of the broadband access system through a broadband access channel, (i) data comprising request for content data, including multimedia data, and (ii) user access device identification in the broadband access system through a broadband access system access level, (b) transferring, from the network kernel of the broadband access system to the at least one user access device, the content data, including multimedia data, in response to the request received from the user access device, (c) forming a content data transfer schedule, including multimedia data, for at least one of user access devices or for at least one group of user access devices, and (d) transferring the content data via unicast, multicast or broadband broadcast, including multimedia data, for the at least one of user access devices or for the at least one group of user access devices in accordance with the schedule, characterized by forming a transfers' base of constant content-channels, containing established frequency settings and signal modulation mode in a broadband access channel for transfer of multimedia data of constant content-channels and/or descriptors of constant content-channels, list of content-units, and metadata of content-units;

forming a transfers' base of current dynamic content-channels, metadata of content-units and descriptors of current content-channels;

forming multimedia database for VoD and/or nVoD services, containing content-units of constant or dynamic content-channels and being connected to the transfers' base of constant content-channels and to the transfers' base of current dynamic content-channels;

forming multimedia channel data, containing advertising and/or information content-units;

sending, to the at least one user access device, a data packet, including content-units of the constant content-channels, the current dynamic content-channels, the metadata of content-units, and/or the VoD and/or nVoD service data, and/or the multimedia channel data, sending, to the at least one user access device, a data packet including a request for choice in time interval T of a content-unit of constant content-channel and VoD service and/or nVoD service, forming a database on services server in the network kernel, the database including data associated with (i) every identified user or every identified user group, (ii) user choices of content-units of content-channels or VoD service and/or nVoD service, estimating a number of users with identical content-unit choice in time interval T based on the database and rearrangement of users or forming at least one new user group based on defined user quantity, establishing at least one boundary value for the number of users with identical choice of content-unit, forming a data transfer schedule with content-units of current dynamic content-channel and/or VoD and/or nVoD services in accordance to the data received from the at least one user access device, for the at least one user access device augmenting quantity of packets' transfer for multicast and broadband broadcast in downlink channel of broadband access for content-unit, which was chosen by a certain amount of users larger than boundary value, and/or multimedia data during time interval $t_1<T<t_2$, where $t_1$—beginning of content-unit translation, which was chosen by a certain amount of users larger than boundary value and $t_2$—end of content-unit translation, which was chosen by a certain amount of users larger than boundary value, according to the schedule, reduction of data packets transfer quantity in multicast and/or broadband broadcast in downlink channel of broadband access for content-unit, which was chosen by a certain amount of users, larger than boundary value, in time $t_k>t_1$, forming and transfer of data block to at least one user access device, which contains data with informational notification to users about access time $t_3$ to the content-unit, which was chosen by a certain amount of users, larger than boundary value, or informational notification about a possibility to download a content-unit, which was chosen by a certain amount of users, smaller than boundary value, via VoD and/or nVoD service, in time $t_4>t_3$, transferring to at least one user access device, which did not send data about user's choice of content-unit according to the request, content-unit of constant content-channel according to current data transfer of content-channel to this specific user access device, which is similar in meaning with content-unit, which was translated during time T or content-unit of a constant content-channel, which was chosen by most users according to database statistics, forming and sending data, which contain contextual advertising or reference information, to user access device from group of identified users, forming and sending a message to the user access device about switching to another current dynamic content-channel or to download and playback previously formed data with by means of VoD and/or nVoD services to the identified user access device in each group of identified users, formed according to the database statistics, and forming of database on services server in the network kernel which contains data about every identified user or every identified user group, based on (i) data about request or selection of content-units or content-channels or VoD and or nVoD services or (ii) data with reference about content-unit or content-channel or VoD and/or nVoD services or (iii) data about quantity and time of moving between content-channels or VoD and/or nVoD services or (iv) multimedia channel data sent through the unicast system or multicast system.

2. A method as claimed in claim 1, characterized by data including data in IP-packets and/or voice signal and/or video signal and/or multimedia channel data.

3. A method as claimed in claim 1, characterized by performing of width augmentation of frequency range of downstream channel of broadband access system for content-unit, which was chosen by a certain amount of users larger than boundary value and/or for multimedia data during time interval T.

4. A method as claimed in claim 1, characterized by performing of width reduction of frequency range of downstream channel of broadband access system for content-unit, which was chosen by a certain amount of users larger than boundary value and/or for multimedia data at time $t_2$.

5. A method as claimed in claim 1, characterized by forming of data, which contain schedule of content-units of dynamic content-channels, constant content-channels, VoD and/or nVoD services, includes data with audio, video and content-units fragments.

6. A method as claimed in claim 1, characterized by ensuring of users' access to the database, which contains data about each identified user or about each group of identified users.

7. A method as claimed in claim 1, characterized by ensuring transfer of data blocks between the user access device and services server in the network kernel by means two-way connection between a base station and a user station in a wireless broadband access system.

8. A method as claimed in claim 7, characterized by dividing of each data block into N parts in the converter of a direct channel of the base station.

9. A method as claimed in claim 8, characterized by encoding of each N-part of the data block by means of an encoder of the base station into the transport code.

10. A method as claimed in claim 9, characterized by conversion of each encoded N-part of the data block in an N-modulator of the direct channel of the base station into a signal.

11. A method as claimed in claim 10, characterized by transferring a signal to the receiver of the user station by means of the base station antenna.

12. A method as claimed in claim 11, characterized by performing demodulation of by means of N-demodulators of the user station.

13. A method as claimed in claim 12, characterized by combining of N-parts of demodulated signal into the data block by means of the user station converter.

14. A method as claimed in claim 13, characterized by forming of a database, which contains data about user choice, on each sector of a base station antenna.

15. A method as claimed in claim 14, characterized by performing of conversion of each encoded N-part of the data block into a signal by an N-modulator of a direct channel of the base station, which is located separately from a corresponding N-transmitter of the base station.

16. A method as claimed in claim 7, characterized by providing of the data block transfer between user access device and the services server in the network kernel by means two-way connection between base station and the user station in the wireless broadband access system with usage of duplex channel with time division or duplex channel with frequency division.

17. A method as claimed in claim 7, characterized by providing of the data block transfer between the user access device and the services server in the network kernel by means two-way connection between base station and user station in the wireless broadband access system with usage of an asymmetrical channel.

* * * * *